US012664306B1

(12) United States Patent
Jayapalan et al.

(10) Patent No.: US 12,664,306 B1
(45) **Date of Patent: *Jun. 23, 2026**

(54) DYNAMIC TAGGING OF MEDIA FOR SERVICE SESSIONS

(71) Applicant: United Services Automobile Association (USAA), San Antonio, TX (US)

(72) Inventors: Vijay Jayapalan, San Antonio, TX (US); Gregory Yarbrough, San Antonio, TX (US); Eric J. Smith, Helotes, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/987,196

(22) Filed: Dec. 19, 2024

Related U.S. Application Data

(63) Continuation of application No. 17/002,345, filed on Aug. 25, 2020, now Pat. No. 12,182,299, which is a
(Continued)

(51) Int. Cl.
*G06F 21/62* (2013.01)
*G06F 16/27* (2019.01)
(Continued)

(52) U.S. Cl.
CPC .......... *G06F 21/6245* (2013.01); *G06F 16/27* (2019.01); *G06F 16/48* (2019.01);
(Continued)

(58) Field of Classification Search
CPC .... G06F 21/6245; G06F 16/27; G06F 16/487; G06F 16/489; G06F 16/5866;
(Continued)

(56) References Cited

U.S. PATENT DOCUMENTS 5,757,417 A    5/1998  Aras et al.
7,913,167 B2   3/2011  Cottrille
(Continued)

OTHER PUBLICATIONS

'www.intelligentvoice.com' [online]. "Audio Redaction—New in V4," May 2014, [retrieved on Jul. 31, 2017]. Retrieved from the Internet: URL<http://www.intelligentvoice.com/blog/audio-redaction-new-v4/>. 1 page.
(Continued)

*Primary Examiner* — Sunghyoun Park
(74) *Attorney, Agent, or Firm* — Fish & Richardson P.C.

(57) ABSTRACT

Techniques are described for real time monitoring and tagging of media content generated during a service session between an individual and a service representative (SR). Media content received during a service session may be dynamically tagged with one or more metadata tags during the service session, the tag(s) indicating portion(s) of the media content that potentially include sensitive information. Tagging may be based on a SR's gestures, clicks, keystrokes, mouse-overs, and/or other actions performed in a SR user interface (UI) during the service session. The media content may be redacted based on the tags to remove and/or obfuscate potentially sensitive information.

20 Claims, 5 Drawing Sheets

Related U.S. Application Data continuation of application No. 15/584,292, filed on May 2, 2017, now Pat. No. 10,789,385.

(60) Provisional application No. 62/331,826, filed on May 4, 2016.

(51) Int. Cl.

| | |
|---|---|
| *G06F 16/48* | (2019.01) |
| *G06F 16/487* | (2019.01) |
| *G06F 16/58* | (2019.01) |
| *G06K 19/00* | (2006.01) |
| *G06F 16/23* | (2019.01) |

(52) U.S. Cl.
CPC .......... *G06F 16/487* (2019.01); *G06F 16/489* (2019.01); *G06F 16/5866* (2019.01); *G06K 19/00* (2013.01); *G06F 16/23* (2019.01); *G06F 21/62* (2013.01); *G06F 21/6218* (2013.01)

(58) Field of Classification Search
CPC .......... G06F 16/48; G06F 16/23; G06F 21/62; G06F 21/6218; G06K 19/00
See application file for complete search history.

(56) References Cited

U.S. PATENT DOCUMENTS

| | | | |
|---|---|---|---|
| 10,789,385 | B1 | 9/2020 | Jayapalan et al. |
| 12,182,299 | B1 | 12/2024 | Jayapalan et al. |
| 2010/0205667 | A1* | 8/2010 | Anderson ............... G06F 3/013 |
| | | | 726/19 |
| 2011/0265177 | A1* | 10/2011 | Sokolan ................ G06F 16/248 |
| | | | 726/19 |
| 2013/0013699 | A1 | 1/2013 | Huxley |
| 2014/0108958 | A1* | 4/2014 | Toepper .................. G06F 3/048 |
| | | | 715/753 |
| 2014/0280172 | A1 | 9/2014 | Amir et al. |
| 2015/0030084 | A1 | 1/2015 | Marchya et al. |
| 2015/0106841 | A1 | 4/2015 | Wolf et al. |
| 2015/0373281 | A1 | 12/2015 | White et al. |
| 2016/0378276 | A1 | 12/2016 | Shah |
| 2017/0024385 | A1 | 1/2017 | Drake et al. |
| 2017/0048275 | A1 | 2/2017 | John et al. |
| 2017/0052239 | A1 | 2/2017 | Nagasawa et al. |
| 2017/0103099 | A1* | 4/2017 | Bitar ..................... G06F 16/284 |

OTHER PUBLICATIONS

'www.nexidia.com' [online]. "AudioFinder," 2015, [retrieved on Jul. 31, 2017]. Retrieved from the Internet: URL<http://www.nexidia.com/media/2455/nx_audiofinder_ov_2015.pdf>. 2 pages.

'www.oxilio.com' [online]. "Nice Redaction Solution, Maintaining Compliance and Privacy," Aug. 2014, [retrieved on Jul. 31, 2017]. Retrieved from the Internet: URL<http://www.oxilio.com/assets/img/upload/pdf-partners-23.pdf>. 4 pages.

* cited by examiner

DYNAMIC TAGGING OF MEDIA FOR SERVICE SESSIONS

CROSS-REFERENCE TO RELATED APPLICATIONS

This application is a continuation application of and claims priority under 35 U.S.C. § 120 to U.S. application Ser. No. 17/002,345, filed on Aug. 25, 2020, which is a continuation application of and claims priority under 35 U.S.C. § 120 to U.S. application Ser. No. 15/584,292, filed on May 2, 2017, now U.S. Pat. No. 10,789,385, which is related to, and claims priority to, U.S. Provisional Patent Application Ser. No. 62/331,826, titled "Dynamic Tagging of Media for Service Sessions," which was filed on May 4, 2016, the entirety of each of which are incorporated by reference into the present disclosure.

BACKGROUND

An organization may use any number of computing systems, communications networks, data storage devices, or other types of systems to provide services to individuals. An organization may also employ service representatives that use the various systems to assist individuals in service sessions that are conducted over the telephone, in a video conference, through text chat sessions, in person, or over other communication channels. In some instances, recordings of the service sessions may be made and stored to be employed later for quality assurance, issue resolution, auditing, training speech recognition engines, and/or other purposes.

SUMMARY

Implementations of the present disclosure are generally directed to tagging media content generated during a service session. More specifically, implementations are directed to adding metadata tag(s) to media content at location(s) based on actions performed in a user interface, and redacting and/or obfuscating the content as indicated by the location(s) of the tags.

In general, innovative aspects of the subject matter described in this specification can be embodied in methods that include actions of: receiving media content generated during a service session; detecting at least one action performed in a user interface (UI) during the service session and, in response, adding at least one tag to the media content at a location, in the media content, that corresponds to a time of the at least one action; redacting at least one portion of the media content to generate redacted media content, the at least one portion bounded in the media content by the at least one tag; and providing the redacted media content for storage on at least one data storage device.

Implementations can optionally include one or more of the following features: the at least one tag includes a first tag that is added to the media content at a first time that corresponds to a selection of a text entry element of the UI, and a second tag that is added to the media content at a second time that corresponds to a deselection of the text entry element of the UI; the at least one tag includes a first tag that is added to the media content at a first time that corresponds to at least one keystroke detected in a text entry element of the UI, and a second tag that is added to the media content at a second time that corresponds to a cessation of the at least one keystroke detected in the text entry element of the UI; the media content is audio content; redacting the at least one portion of the media content includes replacing the at least one portion with one or more of static, music, a tone, white noise, and silence; the media content is video content; redacting the at least one portion of the media content including replacing the at least one portion with one or more frames that are blank or monochromatic; redacting the at least one portion of the media content includes replacing the at least one portion with content indicating a redaction; the service session includes communications between a service representative (SR) and a customer; the media content is generated by the communications of the customer; the at least one action is performed by the SR in the UI; and/or the at least one portion of the media content includes personally identifiable information (PII) for the customer.

Other implementations of any of the above aspects include corresponding systems, apparatus, and computer programs that are configured to perform the actions of the methods, encoded on computer storage devices. The present disclosure also provides a computer-readable storage medium coupled to one or more processors and having instructions stored thereon which, when executed by the one or more processors, cause the one or more processors to perform operations in accordance with implementations of the methods provided herein. The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

Implementations of the present disclosure provide one or more of the following technical advantages and/or improvements over previously available solutions. Implementations enable the automatic tagging of potentially sensitive information in a media file generated during a service session, and the automatic redaction of media files to remove and/or obfuscate potentially sensitive information. Accordingly, implementations provide more reliable redaction compared to traditional manual redaction methods that are susceptible to operator error and to the misidentification and/or failure to identify sensitive data to be redacted. Moreover, by providing a more reliable technique for redacting sensitive information from media content, implementations avoid the need to perform repeated analyses to correct previous errors in identifying and redacting sensitive information. Accordingly, implementations may use less processing power, storage capacity, memory, network bandwidth, and/or other computing resources compared to traditional systems which may require repeated analyses to adequately redact sensitive information from media content. Further, because at least some implementations may store tagged media that is redacted in real time for presentation to users, such implementations may consume less storage space than traditional systems which may store both a manually redacted and an original version of the media.

Moreover, by enabling the redaction of potentially sensitive information from media content, implementations enable the media content to be distributed, in redacted form, more widely than if the content had not been redacted. For example, after sensitive information has been redacted from the media content, the content may be distributed to a broader set of individuals that is not limited to those individuals who are authorized to access sensitive information. Moreover, the redacted content may be stored on storage devices that are less secure than those devices where the un-redacted, potentially sensitive content is stored, leading to potential cost savings in storage systems. In traditional systems, media content that includes potentially sensitive information is segregated and difficult to access in a restrictive environment, to ensure the security of the potentially sensitive information. Implementations enable a lower cost storage solution for redacted content, while reserving the higher cost secure storage for the content that still includes potentially sensitive information.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
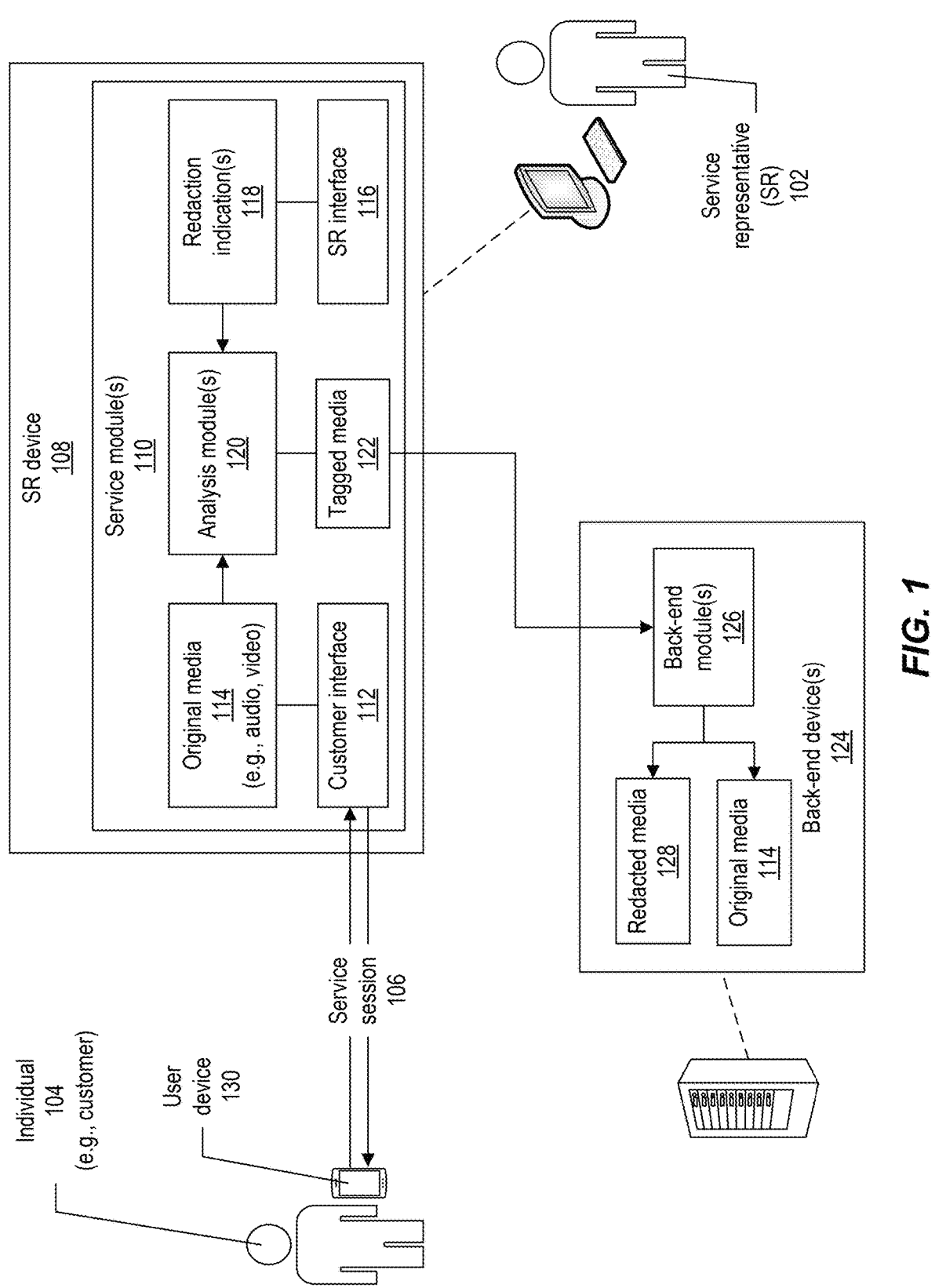
FIG. 1 depicts an example system for tagging media content generated during service sessions, according to implementations of the present disclosure.

Implementations of the present disclosure are directed to systems, devices, methods, and computer-readable media for real time monitoring and tagging of media content generated during a service session between an individual and a service representative (SR). Media content is received during a service session, and the media content may be dynamically tagged with one or more metadata tags during the service session. In some instances, the tag(s) indicate one or more portions of the media content that potentially include sensitive information such as personally identifiable information (PII). During a service session the SR may input information regarding the individual being serviced (e.g., a customer) into a UI, where such information is to be stored in one or more records for later use by internal processes and/or employees within an organization. In some implementations, potentially sensitive information may be tagged in the media content based on a SR's gestures, clicks, keystrokes, mouse-overs, and/or other actions performed in a SR user interface (UI) during the service session. For example, when the SR adds information into a UI field for a social security number (SSN), and/or when the SR selects (e.g., sets focus to) the UI field to activate that UI field for data entry, a tag may be added to the media content to indicate the start of sensitive information (e.g., the SSN) in the media content. When the SR discontinues typing into the UI field, and/or when the SR deselects the UI field (e.g., sets focus elsewhere), a tag may be added to the media content to indicate the end of the sensitive information. Accordingly, the tags may indicate those portion(s) of the media content that potentially include sensitive information. The tagged media content may be provided for storage.

When a particular user requests access to the media content, a determination is made whether the particular user is authorized to access the original version of the media content (e.g., including the sensitive information) or is authorized to access a redacted version of the media content (e.g., omitting the sensitive information). If the user is not authorized to access the unredacted, original version, the redacted version may be provided in response to the request. In some implementations, the media content is redacted to remove, obfuscate, and/or hide the portion(s) indicated by the tag(s). For example, in an audio file the tagged portion(s) may be replaced with music, tone, white noise, null audio data (e.g., silence), and/or other data that does not include the sensitive information. In some implementations, both a redacted version and an unredacted original version of the media content are stored, and the version presented may depend on the access rights of the user requesting access, e.g., whether the user is authorized to access sensitive information. In some implementations, the tagged version of the media content is stored, and the media content may be dynamically redacted and provided in response to an access request from a user who does not have rights to access the unredacted version.

Various types of media content may be generated during a service session between an individual and a SR. In some instances, media content includes audio data such as a recording of the conversation between an individual and a SR during a service session. Media content may also include text transcriptions of audio data. In some instances, media content may include images, video content, and/or document(s) that are provided by the individual to a SR during a service session. Implementations enable an organization to automatically identify sensitive information that may be present in the various type(s) of media content generated during service sessions, where such identification is based at least partly on the actions performed by the SR in a UI. The potentially sensitive information may be tagged in the media content to ensure that the potentially sensitive information is not inadvertently provided to unauthorized individuals within or outside an organization.

In some implementations, media content is dynamically tagged as it is being generated during a service session based on the communications between the SR and an individual. Dynamic actions may also be described as actions performed in real time. Dynamic actions may include actions that can be automatically executed, without requiring human input and without any intentional delay, taking into account the processing limitations of the computing system(s) performing the actions and the time needed to perform the actions. The media content may be tagged in real time with respect to the generation of the media content, during the service session in which the media content is generated. For example, there may be no intentional delay between the generation of the media content and the tagging of the media content, beyond the latency incurred in communicating information over network(s) and/or performing the analysis and tagging of the media content on the computing system(s) that perform such operations.

Sensitive information may include various types of information that are to be stored securely and/or that are not to be published indiscriminately. Access to sensitive information may be limited to those individuals, e.g., within a business or other organization, who are authorized to access such information. For example, high level managers, auditors, regulatory officials, specialists, and/or certified employees may access sensitive information, whereas other employees may not be authorized to access such information. Sensitive information may include PII for one or more individuals, such as personal names, street addresses, email addresses, telephone numbers, login credentials (e.g., user name, password, personal identification numbers, etc.), electronic signatures, and so forth. Sensitive information may also include other types of PII including government-issued identifiers such as SSNs, passport numbers, driver's license numbers, and so forth. Sensitive information may include financial information, such as payment card numbers (e.g., credit, debit, and/or bank card numbers), financial account numbers, financial transaction history, credit information, and so forth. In some instances, sensitive information may include health-related information including but not limited to insurance policy information, medical history, and/or other information regarding the health status and/or treatment of individual(s).

FIG. 1 depicts an example system for monitoring and tagging media content generated during service sessions, according to implementations of the present disclosure. As shown in FIG. 1, a SR 102 may communicate with an individual 104 (e.g., a customer) during a service session 106. A service session 106 may include any number of communications between an individual 104 and a SR 102. In some examples, a service request (e.g., question, complaint, inquiry, etc.) may be received from an individual 104 via a telephone call, a real-time chat session, text message, email, or other communications channel. A SR 102 may respond to the service request via a voice response, text response, or otherwise. The individual 104 may submit any number of follow-up questions, and the SR 102 may respond in turn. Accordingly, a service session 106 may constitute a conversation between the individual 104 and the SR 102 that includes any number of communications sent between the parties over any period of time.

The service session 106 may begin when the individual initially submits a service request and/or when the SR 102 initially responds to the service request. In some examples, the SR 102 may initiate the service session 106 by sending an initial communication to the individual 104. In some instances, the service session 106 is a telephone conversation and/or voice chat session in which audio communications are exchanged between the SR 102 and the individual 104. In some instances, the service session 106 is a video conference or chat in which the SR 102 and the individual 104 converse by exchanging audio communications as well as video and/or still image(s). During the service session 106, the SR 102 and the individual 104 may exchange screen shots or other images. For example, the SR 102 may be assisting the individual 104 in navigating a user interface, and the individual 104 may send image(s) of one or more screens of the user interface to help guide the conversation.

The SR 102 may employ a SR device 108, which may include any suitable type of computing device. The SR device 108 may execute one or more service modules 110 that facilitate the SR's communications with the individual 104. For example, the service module(s) 110 may provide voice telephony services and/or audio/video chat functionality that enables the SR 102 to engage in a voice and/or video conversation with the individual 104. As another example, the service module(s) 110 may provide real time (e.g., chat) functionality, that enables the SR 102 to exchange text messages with the individual 104. The service module(s) 110 may include a customer interface 112 that receives data from the individual 104, and that sends data to the individual 104, during the service session 106. The customer interface 112 may be configured to send and receive varying types of data, including audio data, video data, image(s), graphics, attached file(s) (e.g., screenshot(s) or other document(s)), and so forth. The individual 104 may employ a user device 130 to access the customer interface 112 and communicate during the service session 106. The user device 130 may include any suitable type of computer device, such as a desktop computer, laptop computer, tablet computer, smartphone, wearable computer, and so forth.

The service module(s) 110 may include a SR interface 116 that receives data from the SR 102, and that sends data to the SR 102, during the service session 106. The SR interface 116 may be configured to send and receive varying types of data, including audio data, video data, image(s), graphics, attached file(s) (e.g., screenshot(s) or other document(s)), and so forth. In some implementations, the SR interface 116 includes a graphical user interface (GUI) that includes any suitable number and type of UI elements such as entry fields (e.g., for text, number, and/or symbol data), buttons, lists, menus, and so forth. The SR interface 116 may generate one or more redaction indications 118 during a service session 106. In some implementations, the redaction indication(s) 118 may be generated based on actions performed by the SR 102 in the SR interface 116. For example, the SR's selection (or deselection) of a particular UI element and/or keystroke(s) in a particular UI element may trigger a redaction indication 118.

During the service session 106, one or more types of media content, e.g., original media 114, may be generated. The original media 114 may include audio data if the service session 106 is being conducted as a telephone conversation, voice chat, audio chat, and/or video conference session using a telephone service, a voice over internet protocol (VOIP) service, a video chat service, and so forth. In scenarios where the service session 106 is a video chat session, the original media 114 may include image(s) or video data of the SR 102 and/or individual 104. The original media 114 may also include image(s) and/or video of a user interface being employed by the individual 104 and/or SR 102. In some instances, the original media 114 may include text data, e.g., if the service session 106 is being conducted as a text chat session or some other exchange of messages that include text.

In some implementations, the service module(s) 110 may include one or more analysis modules 120. During the service session 106, the analysis module(s) 120 may receive the original media 114 and the redaction indication(s) 118. The analysis module(s) 120 may generate tagged media 122 including one or more metadata tags applied to the original media 114 based on the redaction indication(s) 118. Implementations support the use of any suitable type and number of tags in the tagged media. For example, in instances where the original media 114 includes audio data, the tags may include audio tag(s) added to the original media 114. The audio tag(s) may be (e.g., brief) portions of audio content that are outside the typical audible range of humans, but that are detectable by an audio analysis process.

In instances where the original media 114 includes text transcriptions of audio data, the tags may include metadata tags arranged according to an Extensible Markup Language (XML) format or other suitable metadata format(s). In instances where the original media 114 includes image data, the tags may include watermarks, (e.g., inconspicuous)

pixel(s), and/or other data added to one or more images. In instances where the original media 114 includes video data, the tags may include frame(s) that are inserted at the appropriate position(s) in the video stream.

The tags may be inserted into the original media 114 according to the timing of the redaction indication(s) 118. For example, a first tag may be inserted at a time that corresponds to the generation or receipt of a first redaction indication 118 indicating that the SR 102 has selected and/or begun typing into a particular UI element of the SR interface 116, and a second tag may be inserted at a time that corresponds to the generation or receipt of a second redaction indication 118 indicating that the SR 102 has deselected and/or stopped typing into the particular UI element of the SR interface 116. Accordingly, the tags may include a begin tag and an end tag that respectively indicate the beginning and the end of a portion of the tagged media 122 that includes potentially sensitive information.

The tagged media 122 may be sent to one or more back-end devices 124. The back-end device(s) 124 may include any suitable number and/or type of computing devices, such as server computer(s), distributed computing device(s) (e.g., cloud server(s)), and so forth. The back-end device(s) 124 may execute one or more back-end module(s) 126. The back-end module(s) 126 may receive the tagged media 122. In some implementations, the back-end module(s) 126 may generate redacted media 128 based on the tagged media 122. The redacted media 128 may be generated by redacting one or more portions of the tagged media 122 that are defined by the tags, e.g., portion(s) that begin with a begin tag and end with an end tag. In instances where the media content includes audio data, redaction may include replacing portion(s) with music, tone(s), static, white noise, and/or silence. In instances where the media content includes video data, redaction may include replacing audio data of the video with music, tone(s), static, white noise, and/or silence. Redaction may also include removing one or more frames of video data and/or replacing frame(s) with blank and/or monochromatic frame(s). Redaction of image data may include removing portion(s) of image(s) and/or replacing image(s) with blank and/or monochromatic image(s). Redaction of text data may include removing portion(s) of text and/or replacing the removed portion(s) with whitespace or other repeated character data. In video and/or image data, redaction may include removing and/or obfuscating those portion(s) of image(s) and or video frame(s) that include potentially sensitive information.

In some instances, redaction may include replacing redacted portion(s) with other content that indicates a redaction has occurred. For example, the redaction portion(s) may be replaced with text that reads "this portion has been redacted." As another example, redaction portion(s) may be replaced with audio data of a voice recording, the voice (e.g., repeatedly) reciting "this portion has been redacted."

In some implementations, the redacted media 128 may be generated by the back-end module(s) 126 in response to receiving the tagged media 122. In some implementations, the tagged media 122 may be stored on the back-end device(s) 124 and the redacted media 128 may be dynamically generated in response to receiving a request to access the media. For example, an access request may be received from an individual who is authorized to access the redacted media 128 but not the original media 114, and the redacted media 128 may be generated based on the tagged media 122 in response to the request.

In some implementations, the original media 114 may be communicated from the SR device 108 to the back-end device(s) 124 and stored on the back-end device(s) 124. The original media 114 may be provided for presentation to user(s) who are authorized to access the original, unredacted media content. In some instances, the tagged media 122 may be communicated to, and/or stored on, the back-end device(s) 124 and made available to users who are authorized to access the unredacted media. The tagged media 122 may include all the information present in the original media 114, and the tags added to the tagged media 122 may not prevent an authorized user from accessing all the information present in the original media 114.

Although FIG. 1 depicts an example system in which the redacted media 128 and the original media 114 are stored on the back-end device(s) 124, implementations are not limited to such a storage configuration. In some instances, the redacted media 128, the original media 114, and/or the tagged media 122 may be stored on one or more data storage devices that are external to the back-end device(s) 124 and accessible over one or more networks. The original media 114 and/or the tagged media 122 may be stored in an encrypted format and/or in data storage that is secured against unauthorized access, to ensure that sensitive information is not accessible to unauthorized users, processes, and/or devices. In some implementations, the redacted media 128 may also be stored in an encrypted format and/or otherwise secured, and the original media 114 and/or tagged media 122 may be stored with stronger protections and/or more strongly encrypted to provide additional safeguards for the potentially sensitive information.

Figure 2:
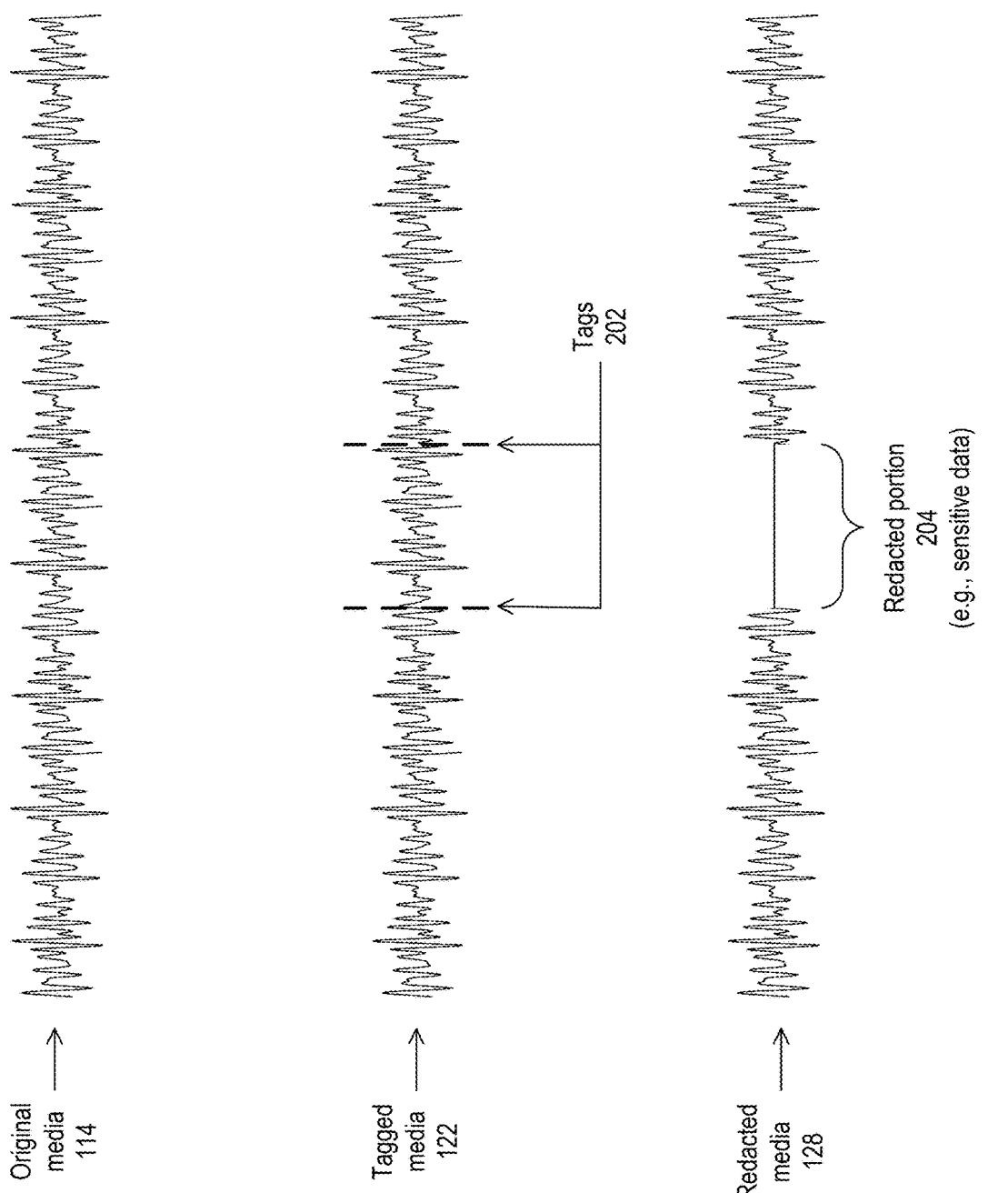
FIG. 2 depicts an example of media content, tagged media content, and redacted media content, according to implementations of the present disclosure.

FIG. 2 depicts an example of media content, tagged media content, and redacted media content, according to implementations of the present disclosure. In the examples of FIG. 2, the various media are depicted as waveform data such as may describe audio content. As described above, implementations also handle other types of media content. The original media 114 may include any amount of data spans at least a portion of the time during which the service session 106 was conducted. In some instances, the original media 114 may include a stream of audio and/or video data that is received during the service session 106. Such a stream of data may be captured in a file. The original media 114 may be processed and tagged to generate the tagged media 122. In some implementations, one or more tags 202 may be added to the original media 114 according to the timing of the redaction indication(s) 118 generated based on the SR's action(s) in the SR interface 116. In some implementations, tags 202 may be included pairwise in the tagged media 122, with each pair of tags 202 indicating a beginning and an end of a portion to be redacted. An instance of tagged media 122 may include any number of tags 202, and/or any number of pairs of tags 202, to indicate portion(s) to be redacted. The redacted media 128 may include any number of redacted portions 204, where each redacted portion 204 is bounded by a pair of tags 202 in the tagged media 122.

In some implementations, the tagged media 122 may be compared to the original media 114 (e.g., by user(s) who are authorized to access sensitive information) to determine how accurately the tags 202 indicate the presence of sensitive information in the media content. Such user(s) may adjust the tags 202 as needed to adequately encompass the sensitive information for redaction as appropriate. In some implementations, automated analysis such as natural language processing, semantic analysis, keyword identification, pattern recognition, and/or other techniques may be employed to analyze the original media 114 after tagging has been performed, to verify that the tagging accurately encompasses the sensitive information present in the media content, and the tagging may be adjusted as needed. The result(s) of such manual and/or automatic quality control analyses may be employed to refine the analysis and tagging operations of the analysis module(s) 120.

Figure 3:
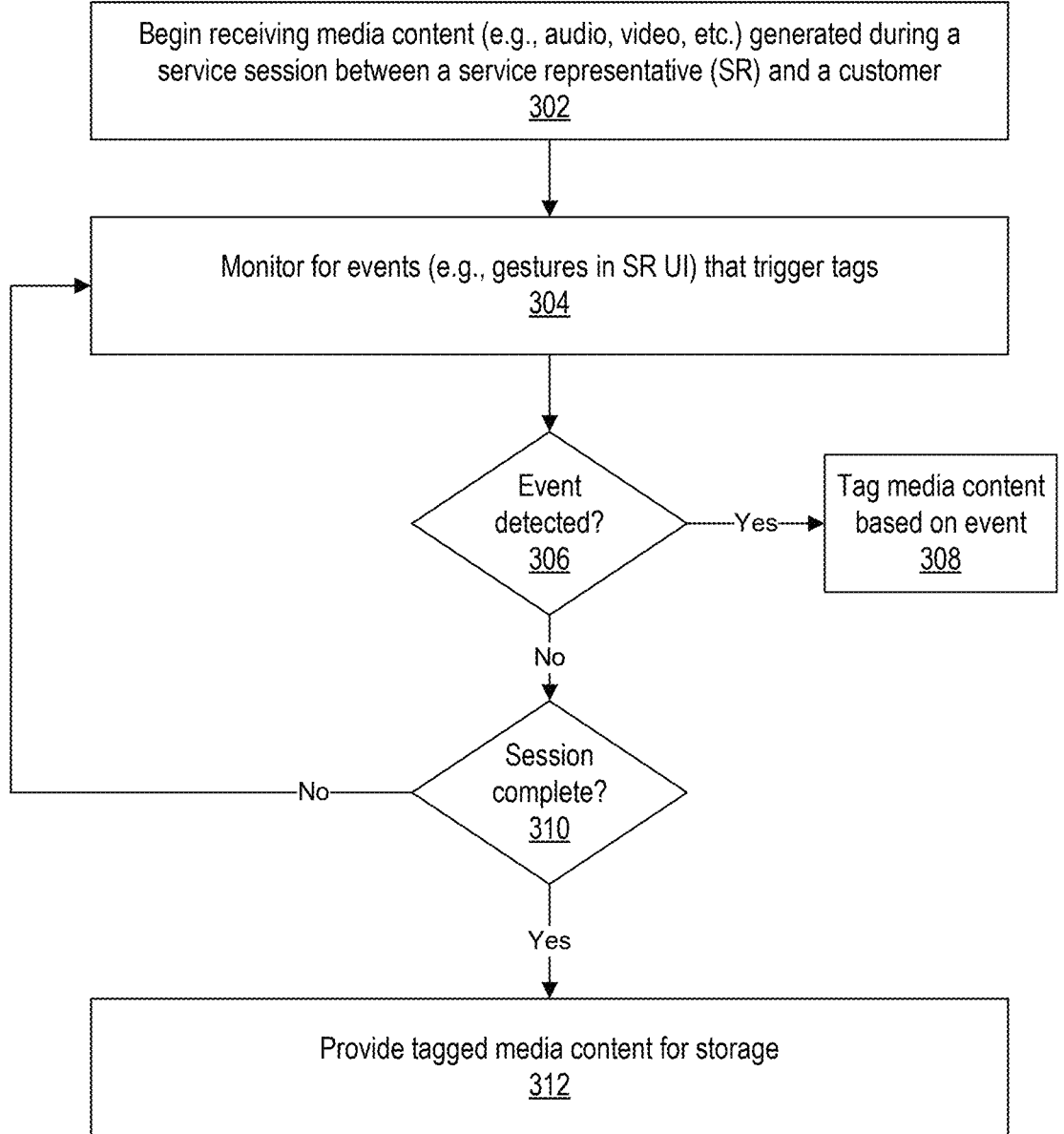
FIG. 3 depicts a flow diagram of an example process for dynamically tagging media content generated during a service session, according to implementations of the present disclosure.

FIG. 3 depicts a flow diagram of an example process for dynamically tagging media content generated during a service session, according to implementations of the present disclosure. Operations of the process may be performed by one or more of the service module(s) 110, the customer interface 112, the analysis module(s) 120, the SR interface 116, the back-end module(s) 126, and/or other software module(s) executing on the user device 130, the SR device 108, the back-end device(s) 124, or elsewhere.

Media content, e.g., original media 114, may be received (302). The SR device 108 may begin receiving the media content generated during a service session 106 between the SR 102 and the individual 104 (e.g., a customer). In some instances, the media content may be a stream of audio and/or video data that records the various communications between the SR 102 and the individual 104 during the service session 106.

As the media content is received, the process may monitor (304) for events that trigger the addition of tags into the media content. In some implementations, such events may include redaction indication(s) 118 that are generated based on action(s) performed by the SR 102 in the SR interface 116 as described above. Such redaction indication(s) 118 may include action(s) performed with respect to UI elements that are designated for the entry and/or other manipulation of sensitive information in the SR interface 116, such as text entry fields for entry of alphanumeric data for sensitive fields (e.g., SSN, credit card number, and so forth). For example, the selection of a UI element to enter sensitive information and/or keystrokes detected in such a UI element may trigger a redaction indication 118. In some instances, the SR interface 116 may include a button or other control to enable the SR 102 to manually toggle (on or off) the identification of sensitive information. For example, the SR 102 may select the control to indicate a begin tag and the SR 102 may deselect the control to indicate an end tag. In this way, the SR interface 116 may enable the SR 102 to generate redaction indication(s) 118 to tag a portion of the media content that may include sensitive information. In some implementations, the SR interface 116 may present a (e.g., visual, audible, and/or haptic) indication to the SR 102 to indicating that a begin tag has been triggered and that a corresponding end tag has not yet been triggered, such that the media content generated while the indication is presented will be redacted when accessed by unauthorized users.

Other types of events may also trigger the addition of tags. In some implementations, the media content may be analyzed (e.g., in real time as it is generated) to identify possible sensitive information in the media content. For example, the media content may be analyzed through natural language processing, semantic analysis, keyword identification, pattern recognition, and/or other techniques to identify the presence (or possible presence) of various types of sensitive information in the media content.

If an event is detected (306), the media content may be tagged (308) based on the event. As described above, a tag may be added to the media content at a position that corresponds to the timing of the generation and/or receipt of the event. In some implementations, begin tag may be added at a predetermined period of time prior to the receipt and/or generation of the event that triggers a begin tag and/or an end tag may be added at a predetermined period of time after the receipt and/or generation of the event that triggers an end tag. Such offsets may be employed to account for possible latency in the system and to ensure that possibly sensitive information is encompassed by tags in the tagged media 122. In some implementations, the redaction indication(s) 118 and/or other event(s) may include a timestamp indicating to any appropriate degree of precision a date and/or time when the event occurred, such as when the action was performed in the SR interface 116. The timestamp may be employed to synchronize the event with the original media stream to ensure that each tag is added at a position in the media content that corresponds to the timing of the event.

For each event detected, a tag may be added to the original media 114 to generate the tagged media 122. The monitoring for events, and the tagging in response to events, may continue until the service session 106 is complete (310). The service session 106 may be determined to be complete when an end of file is reached in the stream of media content generated during the service session 106. After the service session 106 is complete and the tagged media 122 is generated to include the appropriate number of tags at the appropriate locations in the file, the tagged media 122 may be provided (312) for storage on the back-end device(s) 124 or elsewhere.

Figure 4:
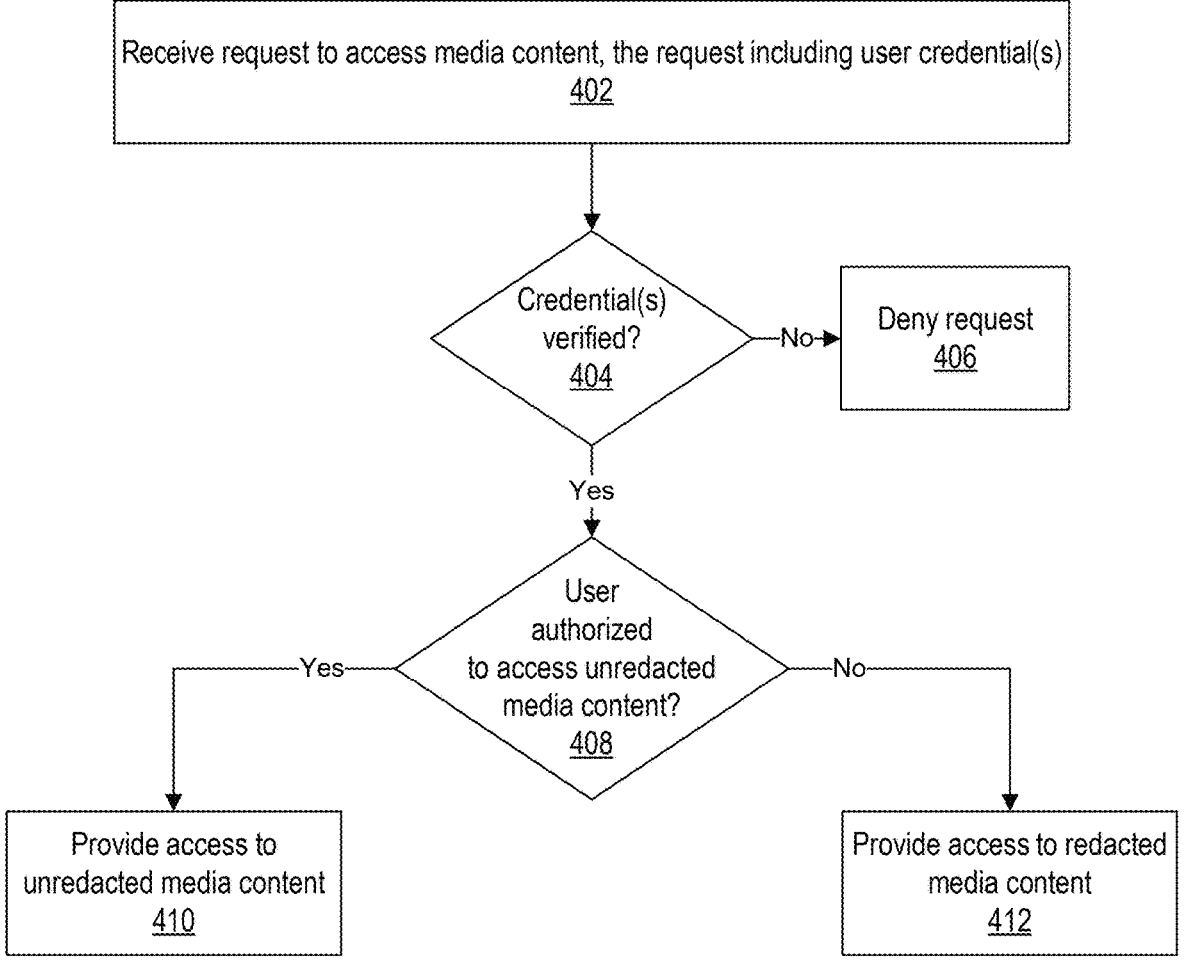
FIG. 4 depicts a flow diagram of an example process for providing access to redacted and/or unredacted media content, according to implementations of the present disclosure.

FIG. 4 depicts a flow diagram of an example process for providing access to redacted and/or unredacted media content, according to implementations of the present disclosure. Operations of the process may be performed by one or more of the service module(s) 110, the customer interface 112, the analysis module(s) 120, the SR interface 116, the back-end module(s) 126, and/or other software module(s) executing on the user device 130, the SR device 108, the back-end device(s) 124, or elsewhere.

A request may be received (402) to access media content generated during a service session 106. In some instances, the request may include one or more credentials of the user who is requesting access. Such credential(s) may include, but are not limited to, a user name (e.g., login), password, PIN, biometric data for the user, answer(s) to knowledge-based challenge question(s) (e.g., "what is your mother's maiden name?"), and/or other types of credential(s) used to validate a user's identity. The credential(s) may be verified (404) by comparing the received credential(s) to a set of credential(s) that was previously provided by the user and stored. If the credential(s) are not verified, the access request may be denied (406).

If the user's credential(s) are verified, a determination may be made (408) whether the user is authorized to access unredacted media content that may include sensitive user information. In some implementations, the user's access permissions may be determined by looking up the user's user name, identification number, or other unique user identifier in a table or other data structure that lists the access permissions of various users. If the user is authorized to access unredacted media content, the user may be provided (410) access to the unredacted media such as the original media 114 and/or the tagged media 122. If the user is not authorized, the user may be provided (412) access to the redacted media 128.

Figure 5:
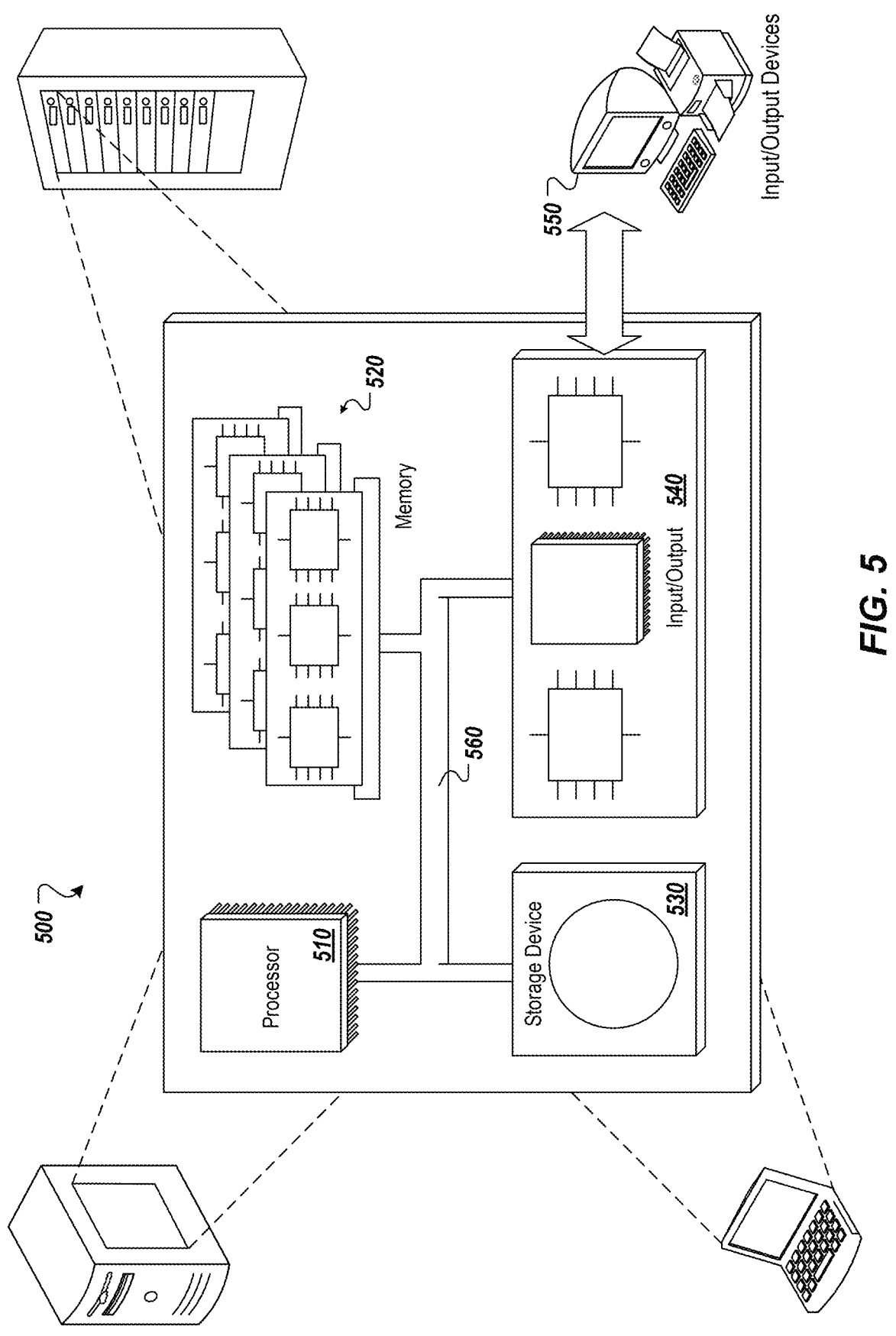
FIG. 5 depicts an example computing system, according to implementations of the present disclosure.

FIG. 5 depicts an example computing system, according to implementations of the present disclosure. The system 500 may be used for any of the operations described with respect to the various implementations discussed herein. For example, the system 500 may be included, at least in part, in one or more of the SR device 108, the user device 130, and/or the back-end device(s) 124 described herein. The system 500 may include one or more processors 510, a memory 520, one or more storage devices 530, and one or more input/output (I/O) devices 550 controllable through one or more I/O interfaces 540. The various components 510, 520, 530, 540, or 550 may be interconnected through at least one system bus 560, which may enable the transfer of data between the various modules and components of the system 500.

The processor(s) 510 may be configured to process instructions for execution within the system 500. The processor(s) 510 may include single-threaded processor(s), multi-threaded processor(s), or both. The processor(s) 510 may be configured to process instructions stored in the memory 520 or on the storage device(s) 530. The processor(s) 510 may include hardware-based processor(s) each including one or more cores. The processor(s) 510 may include general purpose processor(s), special purpose processor(s), or both.

The memory 520 may store information within the system 500. In some implementations, the memory 520 includes one or more computer-readable media. The memory 520 may include any number of volatile memory units, any number of non-volatile memory units, or both volatile and non-volatile memory units. The memory 520 may include read-only memory, random access memory, or both. In some examples, the memory 520 may be employed as active or physical memory by one or more executing software modules.

The storage device(s) 530 may be configured to provide (e.g., persistent) mass storage for the system 500. In some implementations, the storage device(s) 530 may include one or more computer-readable media. For example, the storage device(s) 530 may include a floppy disk device, a hard disk device, an optical disk device, or a tape device. The storage device(s) 530 may include read-only memory, random access memory, or both. The storage device(s) 530 may include one or more of an internal hard drive, an external hard drive, or a removable drive.

One or both of the memory 520 or the storage device(s) 530 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 500. In some implementations, the CRSM may include a data store that provides storage of computer-readable instructions or other information in a non-transitory format. The CRSM may be incorporated into the system 500 or may be external with respect to the system 500. The CRSM may include read-only memory, random access memory, or both. One or more CRSM suitable for tangibly embodying computer program instructions and data may include any type of non-volatile memory, including but not limited to: semiconductor memory devices, such as EPROM, EEPROM, and flash memory devices; magnetic disks such as internal hard disks and removable disks; magneto-optical disks; and CD-ROM and DVD-ROM disks. In some examples, the processor(s) 510 and the memory 520 may be supplemented by, or incorporated into, one or more application-specific integrated circuits (ASICs).

The system 500 may include one or more I/O devices 550. The I/O device(s) 550 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 550 may also include one or more output devices such as a display, LED(s), an audio output device (e.g., a speaker), a printer, a haptic output device, and so forth. The I/O device(s) 550 may be physically incorporated in one or more computing devices of the system 500, or may be external with respect to one or more computing devices of the system 500.

The system 500 may include one or more I/O interfaces 540 to enable components or modules of the system 500 to control, interface with, or otherwise communicate with the I/O device(s) 550. The I/O interface(s) 540 may enable information to be transferred in or out of the system 500, or between components of the system 500, through serial communication, parallel communication, or other types of communication. For example, the I/O interface(s) 540 may comply with a version of the RS-232 standard for serial ports, or with a version of the IEEE 1284 standard for parallel ports. As another example, the I/O interface(s) 540 may be configured to provide a connection over Universal Serial Bus (USB) or Ethernet. In some examples, the I/O interface(s) 540 may be configured to provide a serial connection that is compliant with a version of the IEEE 1394 standard.

The I/O interface(s) 540 may also include one or more network interfaces that enable communications between computing devices in the system 500, or between the system 500 and other network-connected computing systems. The network interface(s) may include one or more network interface controllers (NICs) or other types of transceiver devices configured to send and receive communications over one or more networks using any network protocol.

Computing devices of the system 500 may communicate with one another, or with other computing devices, using one or more networks. Such networks may include public networks such as the internet, private networks such as an institutional or personal intranet, or any combination of private and public networks. The networks may include any type of wired or wireless network, including but not limited to local area networks (LANs), wide area networks (WANs), wireless WANs (WWANs), wireless LANs (WLANs), mobile communications networks (e.g., 3G, 4G, Edge, etc.), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 500 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, implementations may be realized on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical UI or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method performed by at least one processor, the method comprising:

accessing tagged media content including a stream of media content with (i) a first tag added to the stream of media content at a first location in the stream of media content that corresponds to a first time in which a first action is detected and (ii) a second tag added to the stream of media content at a second location in the stream of media content that corresponds to a second time in which a second action is detected, the first tag and the second tag defining at least one portion of the tagged media content, analyzing the stream of media content to determine information that needs to be redacted;

comparing the tagged media content with the stream of media content to determine whether the at least one portion defined by the first tag and the second tag indicates the presence of the information that needs to be redacted;

responsive to comparing, adjusting at least one of the first tag or the second tag such that a portion of the tagged media content having the adjusted at least one of the first tag or the second tag indicates the presence of the information that needs to be redacted; and redacting, by the at least one processor, the portion of the tagged media content having the adjusted at least one of the first tag or the second tag to generate redacted media content.

2. The method of claim 1, wherein the media content is audio content and the first tag and the second tag are audio tags.

3. The method of claim 2, wherein:

redacting the at least one portion of the tagged media content includes replacing the at least one portion with one or more of static, music, a tone, white noise, and silence.

4. The method of claim 1, wherein the media content is video content and the first tag and the second tag are video frames.

5. The method of claim 4, wherein:

redacting the at least one portion of the media content including replacing the at least one portion with one or more frames that are blank or monochromatic.

6. The method of claim 1, wherein redacting the at least one portion of the tagged media content includes replacing the at least one portion of the tagged media content with other content that indicates a redaction has occurred.

7. The method of claim 6, wherein the stream of media content is generated during a communication session including communications between a first user and a second user;

the media content is generated by the communications of the second user; and at least one of the first action or the second action is performed by the first user.

8. The method of claim 7, wherein the at least one portion of the media content includes personally identifiable information (PII) for the second user.

9. A system, comprising:

at least one processor; and a memory communicatively coupled to the at least one processor, the memory storing instructions which, when executed by the at least one processor, cause the at least one processor to perform operations comprising:

accessing tagged media content including a stream of media content with (i) a first tag added to the stream of media content at a first location in the stream of media content that corresponds to a first time in which a first action is detected and (ii) a second tag added to the stream of media content at a second location in the stream of media content that corresponds to a second time in which a second action is detected, the first tag and the second tag defining at least one portion of the tagged media content, analyzing the stream of media content to determine information that needs to be redacted;

comparing the tagged media content with the stream of media content to determine whether the at least one portion defined by the first tag and the second tag indicates the presence of the information that needs to be redacted;

responsive to comparing, adjusting at least one of the first tag or the second tag such that a portion of the tagged media content having the adjusted at least one of the first tag or the second tag indicates the presence of the information that needs to be redacted;

and redacting, by the at least one processor, the portion of the tagged media content having the adjusted at least one of the first tag or the second tag to generate redacted media content.

10. The system of claim 9, wherein the media content is audio content and the first tag and the second tag are audio tags.

11. The system of claim 10, wherein redacting the at least one portion of the media content includes replacing the at least one portion with one or more of static, music, a tone, white noise, and silence.

12. The system of claim 9, wherein the media content is video content and the first tag and the second tag are video frames.

13. The system of claim 12, wherein redacting the at least one portion of the media content including replacing the at least one portion with one or more frames that are blank or monochromatic.

14. The system of claim 9, wherein the media content includes audio content or video content generated during a real-time chat session between a first user and a second user.

15. The system of claim 9, wherein:

the stream of media content is generated during a communication session including communications between a first user and a second user;

the media content is generated by the communications of the second user; and at least one of the first action or the second action is performed by the first user.

16. The system of claim 15, wherein the at least one portion of the media content includes personally identifiable information (PII) for the second user.

17. One or more non-transitory computer-readable media storing instructions which, when executed by at least one processor, cause the at least one processor to perform operations comprising:

accessing tagged media content including a stream of media content with (i) a first tag added to the stream of media content at a first location in the stream of media content that corresponds to a first time in which a first action is detected and (ii) a second tag added to the stream of media content at a second location in the stream of media content that corresponds to a second time in which a second action is detected, the first tag and the second tag defining at least one portion of the tagged media content, analyzing the stream of media content to determine information that needs to be redacted;

comparing the tagged media content with the stream of media content to determine whether the at least one portion defined by the first tag and the second tag indicates the presence of the information that needs to be redacted;

responsive to comparing, adjusting at least one of the first tag or the second tag such that a portion of the tagged media content having the adjusted at least one of the first tag or the second tag indicates the presence of the information that needs to be redacted; and redacting, by the at least one processor, the portion of the tagged media content having the adjusted at least one of the first tag or the second tag to generate redacted media content.

18. The one or more non-transitory computer-readable media of claim 17, wherein the media content is audio content, and wherein redacting the at least one portion of the media content includes replacing the at least one portion with one or more of static, music, a tone, white noise, and silence.

19. The one or more non-transitory computer-readable media of claim 17, wherein the media content is video content, and wherein redacting the at least one portion of the media content including replacing the at least one portion with one or more frames that are blank or monochromatic.

20. The one or more non-transitory computer-readable media of claim 17, wherein the media content includes a text transcription of audio content or video content corresponding to a communication session.

* * * * *